United States Patent Office 3,824,223
Patented July 16, 1974

3,824,223
PROCESS FOR PREPARING A COPOLYMER OF A CONJUGATED DIENE AND ETHYLENE
Kiyoshige Hayashi, Tokyo, and Akihiro Kawasaki and Isao Maruyama, Ichihara, Japan, assignors to Maruzen Petrochemical Co., Ltd., Tokyo, Japan
Filed May 27, 1971, Ser. No. 147,418
Claims priority, application Japan, June 10, 1970,
45/49,470, 45/49,471, 45/49,472, 45/49,473
The portion of the term of the patent subsequent to June 5, 1990, has been disclaimed
Int. Cl. C08d 3/04, 1/14
U.S. Cl. 260—85.3 R    14 Claims

ABSTRACT OF THE DISCLOSURE

Alternating copolymers and/or ethylene rich random copolymers of a conjugated diene and ethylene are formed by reacting the conjugated diene and ethylene in the presence of a catalyst comprising (A) an organoaluminum compound having the formula $AlR_3$ wherein R represents a hydrocarbon radical selected from the group consisting of a $C_1$–$C_{12}$ alkyl, cycloalkyl, aryl and aralkyl radical and (B) an organotitanium compound having

structure wherein R is the same as defined above and X is a halogen.

BACKGROUND OF THE INVENTION

1. Field of the Invention

The present invention relates to a process for preparing a copolymer of a conjugated diene and ethylene, and more particularly, relates to a process for preparing an alternating copolymer of conjugated diene and ethylene whose microstructure of conjugated diene units is lacking in stereospecificity and an ethylene rich random copolymer of conjugated diene and ethylene at the same time. The ratio of the alternating copolymer to the random copolymer in the reaction product can be varied widely by controlling the polymerization conditions. At the ultimate conditions, the former or latter copolymer alone can be prepared.

2. Description of the Prior Art

British Pat. 776,326 (1957), U.S. Pat. 2,968,650 (1961) and German Pat. 1,144,924 (1963) reported a process for preparing copolymer of ethylene and butadiene by using a catalyst system of titanium (IV) chloride and phenyl magnesium bromide, a process for preparing copolymer of ethylene and butadiene by using a catalyst system of titanium (IV) chloride and lithium aluminum hydride and a process for preparing copolymer of ethylene and isoprene by using a catalyst system of titanium (IV) chloride and lithium aluminum tetrabutyl respectively. These copolymers were shown to be polyethylene modified by 10– 20% butadiene or minor amount of isoprene unit. British Pat. 893,462 (1962) and U.S. Pat. 3,244,678 (1966) described the process for preparing copolymer of ethylene and isoprene by using a coordination catalyst system composed of triisobutylaluminum and vanadyl-chloride. The ethylene unit content of the copolymer was in the range of 99% to 90% by weight. The microstructure of isoprene unit of the copolymer was 1,2 and 3,4-structures. The patents also described that the copolymer may be in the form of block copolymer, graft copolymer or random copolymer. On the other hand, Suminoe (Kobunshi Kagaku, *20*, 467 (1963), Kobunshi Gakkai, Tokyo, Japan) reported copolymerization reaction of ethylene and isoprene in the presence of triethylaluminum-titanium (IV) chloride catalyst system. The copolymerization reaction was carried out by introducing gaseous mixture of ethylene and nitrogen at predetermined rate into an n-hexane solution of isoprene and catalyst system at the temperature of ice-water system and at atmospheric pressure. The copolymer was fractionated into 2 fractions by benzene extraction, however both fractions were determined to be block-type copolymer.

Belgium Pats. 625,657 (1963), 625,658 (1963), Japanese Patent Publications 14,813/1964 and 14,814/1964 and Italian Pat. 664,769 (1964) described that linear vulcanizable copolymers of conjugated diolefins and ethylene were produced by using a catalyst system containing hydrocarbon soluble vanadium compounds, such as a halide, oxyhalide, alkoxide or acetylacetonate, e.g. vanadium (IV) chloride, vanadium (III) chloride or vanadium (IV) bromide and an organoaluminum compound containing at least one organic group having strong sterical hindrance, e.g. 3-methylbutyl, cycloalkyl or cyclopentylmethyl. At least, one valency of vanadium and(or) aluminum of the catalyst system were also saturated by a halogen atom. The copolymers obtained were determined to be completely amorphous from X-ray examinations. The patents also described that the distribution of unsaturated units in the copolymer is more homogeneous than that of the one prepared by any previous method. Therefore, the copolymer is considered to be a random copolymer of a conjugated diolefine and ethylene.

British Pat. 1,112,698 (1968) and Japanese Patent Publication 11,303/1970 described processes for preparing an unsaturated, crystalline copolymer comprising macromolecules made up of copolymerized units of ethylene and butadiene in which the butadiene units have an essentially trans-1,4-structure and containing from 0.1 to 5 mol percent butadiene, which copolymers do not exhibit crystallinity typical of butadiene unit of trans-1,4-type by using a catalyst consisting of the reaction product of a complex having the formula $TiCl_4 \cdot 2PR_3$ wherein R is an aryl radical, with an aluminum dialkyl monochloride. Boiling n-heptane insoluble fraction of the copolymer showed, under X-ray, high crystallinity of polyethylene type, while the infra-red spectrum showed unsaturation of trans-type. The copolymer was determined to be a random copolymer of ethylene and butadiene having homogeneous distribution of unsaturated units.

French Pats. 1,302,656 (1962) and 1,334,941 (1963) reported the process for preparing copolymer of ethylene and butadiene having low content of butadiene unit by using a catalyst system of triethylaluminum or diethylaluminum monochloride, vanadium (IV) chloride and trichloroacetic acid. The copolymer is considered to be a linear polyethylene modified by small amounts of butadiene unsaturation.

Japanese Patent Publication 17,144/1969 also described a process for preparing a random copolymer of ethylene and butadiene having low content of butadiene unit by using titanium (IV) chloride, diethylaluminum monochloride and a tertiary diphosphine compound as a catalyst system.

At any rate, there are shown no description with respect to any alternating copolymer of conjugated diene and ethylene and the process for preparing the alternating copolymer in the above references.

Natta (Makromol. Chem., *79*, 161 (1964)) reported that copolymer of butadiene and ethylene was prepared at —25° C. by using a catalyst system of triisobutylaluminum, diisobutylaluminum monochloride, anisol and vanadium (IV) chloride mixed at —78° C. 1.20% of the crude copolymer was n-pentane soluble and diethyl ether insoluble fraction. The fraction was crystalline and its X-ray diagram showed the presence of peaks at angles $2\theta = 20.3$ and $23°$. The mol percent of ethylene unit in the fraction was 50.6% and its intrinsic viscosity was 0.25 (dl./g.). The melting point of the fraction was 60–65° C. The infra-red spectrum of the copolymer showed crystallization sensitive bands at 1206, 1070 and 889 cm.$^{-1}$. On the other hand, although the microstructure of butadiene unit of the fraction was essentially trans-1,4, bands attributable to crystalline trans-1,4 polybutadiene could not be detected at 1235, 1054 and 703 cm.$^{-1}$. From the above results, the fraction was determined to be an alternating copolymer.

French Pat. 1,361,801 (1964) and U.S. Pat. 3,407,185 (1968) reported a crystalline copolymer of butadiene and ethylene having two peaks at 20.5° and 23.2° in the X-ray diagram and showing three bands at 8.27, 9.25 and 11.20 microns in the infra-red spectrum and the method for preparing the copolymer by a catalyst system of vanadium (IV) chloride, trialkylaluminum, dialkylaluminum monochloride and anisol. The copolymer contained from 65 to 35% by mols of butadiene and it comprised long sequence of butadiene units polymerized by trans-1,4-enchainment and alternating with ethylene units in the polymer chain.

Miyoshi (21st Annual Meeting of Japan Chemical Society, Tokyo, 1968) also reported an alternating polymerization of butadiene and ethylene. When the feeding rate of gaseous monomers was high, a catalyst system of titanium (IV) chloride, triethylaluminum and diethylaluminum monochloride produced a mixture of polyethylene and polybutadiene, on the other hand, when the feeding rate was low, the catalyst system produced a crystalline alternating copolymer of butadiene and ethylene. The alternating copolymer was separated from the reaction product as benzene soluble fraction. The molecular weight of the alternating copolymer was 2,000–3,000 and its melting point appeared at 60° C.

SUMMARY OF THE INVENTION

In accordance with this invention, we have found that by using the catalyst system composed of the first component of an organoaluminum compound having the general formula of AlR$_3$ wherein R represents a hydrocarbon radical selected from the group consisting of a C$_1$–C$_{12}$, preferably C$_1$–C$_8$, and more preferably C$_2$–C$_6$, alkyl, cycloalkyl, aryl and aralkyl radicals and the second component of an organotitanium compound having

(R is the same one as described above and X is halogen) structure in the molecule or the catalyst system composed of the first component of an organoaluminum compound having the general formula of AlR$_3$ wherein R is as defined above, the second component of an organotitanium compound having

(R and X are as described above) structure in the molecule and the third component of halogen, a halogen compound or a mixture thereof, high molecular weight alternating copolymer of conjugated diene and ethylene whose microstructure of conjugated diene is lacking in stereoregularity and high molecular weight ethylene rich random copolymer of conjugated diene and ethylene can be prepared at the same time. The ratio of the alternating copolymer to the random copolymer in the reaction product can be varied widely by controlling the polymerization conditions. For example, by decreasing the molar ratio of conjugated diene to ethylene in the initial monomer composition, the ratio of the alternating copolymer to the random copolymer in the reaction product decreases and vice versa. Also, the ratio changes in accordance with the selection of the catalyst system employed. To obtain high ratio of alternating copolymer to random copolymer in the reaction product, it is also necessary to proceed polymerization reaction at mild conditions. At the ultimate conditions, the former or the latter copolymer alone can be prepared.

We have recently proposed in our copending U.S. Ser. No. 124,281, filed Mar. 15, 1971, a process for preparing high molecular weight alternating copolymer of conjugated diene and ethylene whose microstructure of conjugated diene is lacking in stereoregularity and high molecular weight ethylene rich random copolymer of conjugated diene and ethylene at the same time in the presence of the catalyst system composed of the first component of an organoaluminum compound having the general formula of AlR$_3$ wherein R represents a hydrocarbon radical selected from the group consisting of a C$_1$–C$_{12}$, preferably C$_1$–C$_8$, and more preferably C$_1$–C$_6$, alkyl, cycloalkyl, aryl and aralkyl radicals and the second component of titanium (IV) halide having the general formula of TiX$_4$ (wherein X represents halogen) or in the presence of the catalyst system composed of the first component of an organoaluminum compound having the general formula of AlR$_3$ wherein R is as defined above, the second component of titanium (IV) halide having the general formula of TiX$_4$ (wherein X is the same as that defined above) and the third component of a carbonyl group containing compound. The ratio of the alternating copolymer to the random copolymer in the reaction product could also be varied widely by controlling the polymerization conditions. At the ultimate conditions, the former or the latter copolymer alone could be prepared.

From the nuclear magnetic resonance spectra, infrared spectra, X-ray spectra and the results of differential scanning calorimeter measurements, the structures of the high molecular weight alternating copolymer of conjugated diene and ethylene and ethylene rich random copolymer of conjugated diene and ethylene of the present invention are found to be similar to the structures of the alternating copolymer and random copolymer, respectively, obtained by the methods proposed previously by United States in said application Ser. No. 124,281.

For example, the alternating copolymer of butadiene and ethylene of the present invention also corresponds to the copolymer obtained by randomly replacing optional amounts of trans-1,4 butadiene unit of the alternating copolymer of butadiene and ethylene whose microstructure of butadiene unit is all trans-1,4 with cis-1,4 butadiene unit and/(or) 1,2 butadiene unit. The alternating copolymer of butadiene and ethylene of the present invention shows rubber-like elasticity and shows no X-ray crystallinity at room temperature, on the other hand the alternating copolymer of butadiene and ethylene whose microstructure of butadiene units is all trans-1,4 shows resinous properties and shows high X-ray crystallinity at room temperature.

The microstructure of the alternating copolymer of isoprene and ethylene of the present invention is also found to be substantially composed of cis-1,4 structure, trans-1,4 structure and 3,4 structure and therefore isoprene unit of the alternating copolymer shows no stereospecificity.

The molar ratio of conjugated diene to ethylene in the ethylene rich random copolymer of conjugated diene and ethylene of the present invention is also lower than 1/4 (diene/ethylene<1/4). There are observed no diene-diene repeating unit in the nuclear magnetic resonance spectra. The random copolymer is found to be a crystalline polyethylene modified by small amounts of conjugated diene units which are randomly distributed in the polymer main chain.

The methods for analysis of the nuclear magnetic resonance spectra of the alternating copolymer of conjugated diene and ethylene of the present invention was carried out as described in our copending application Ser. No. 124,281.

The alternating copolymer of conjugated diene and ethylene can be sepaarted from the ethylene rich random copolymer of conjugated diene and ethylene by usual solvent extraction method. For example, the alternating copolymer is soluble in chloroform, n-heptane, toluene, diethyl ether, etc., on the other hand the ethylene rich random copolymer of conjugated diene and ethylene is insoluble in the above solvents.

The alternating copolymer of conjugated diene and ethylene of the present invention is rubber-like in character and can be used as polymeric plasticizers, in adhesives and can be vulcanized with sulphur or a sulphur compound to produce vulcanized elastomers. The ethylene rich random copolymer of conjugated diene and ethylene is also useful because by vulcanization with sulphur based mixes they can be transformed into products having mechanical properties. By adding predetermined amounts of rubber-like alternating copolymer of conjugated diene and ethylene into ethylene rich random copolymer of conjugated diene and ethylene, the mechanical properties of the random copolymer also can be modified.

The organoaluminum compounds which form the first component of the catalyst system of this invention are defined by the formula AlR₃ wherein R is a hydrocarbon radical selected from the group consisting of a $C_1$–$C_{12}$, preferably $C_1$–$C_8$, and more preferably $C_2$–$C_6$, alkyl, cycloalkyl, aryl and aralkyl radicals and each R can be the same or different. Mixtures of these organoaluminum compounds may also be employed. Representative of and by no means limiting are such organoaluminum compounds as: trimethylaluminum, triethylaluminum, tri-n-propylaluminum, triisopropylaluminum, tri-n-butylaluminum, triisobutylaluminum, tripentylaluminium, trihexylaluminum, tricyclohexylaluminum, trioctylaluminum, triphenylaluminum tri-p-tolylaluminum, tribenzylaluminum, ethyldiphenylaluminum, ethyl di-p-tolylaluminum, ethyl dibenzylaluminum, diethylphenylaluminum, diethyl-p-tolylaluminum, diethyl benzylaluminum and the like. Mixtures of these compounds may also be employed. Of these, it is usually preferred to employ trialkylaluminum compounds.

The organotitanium compounds having

(R is a hydrocarbon radical selected from the group consisting of a $C_1$–$C_{12}$, preferably $C_1$–$C_8$, and more preferably $C_1$–$C_6$, alkyl, cycloalkyl, aryl and aralkyl radicals and X is halogen) structure in the molecule and forming the second component of the catalyst system of this invention, by no means limiting, are compounds shown by the general formulae of

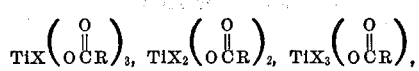

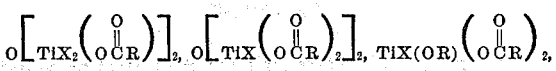

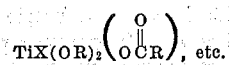, etc.

are mixtures thereof.

A mixture of an organotitanium compound having

(R is as defined above) structure and having no Ti-X linkage in the molecule and halogen, a halogen compound or a mixture thereof can be used as the second component of the catalyst of this invention, provided that said organotitanium compound can react with halogen, said halogen compound or the mixture thereof to produce an organotitanium compound having

structure, in situ. Examples of such

structure containing compounds, by no means limiting, are the compounds shown by the general formulae of

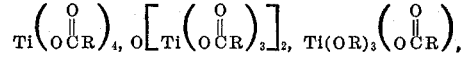

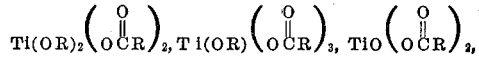

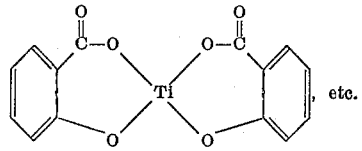, etc.

Examples of R radicals employed in the above organotitanium compounds are, by no means limiting, methyl, ethyl, n-propyl, isopropyl, n-butyl, isobutyl, tert-butyl, pentyl, hexyl, cyclohexyl, octyl, phenyl, p-tolyl, benzyl and other radicals.

The halogen compounds which form the third component of the catalyst system of this invention and also used as the halogen source for transforming the compounds having

structure to the second component of the catalyst system, by no means limiting, are the ones showing Lewis acid property such as compounds of the general formula VX₄ (X is halogen hereinafter the same), VOX₃, WX₆, MoX₅, CrO₂X₂, ZrX₄, FeX₃, BX₃, PX₅, SnX₄, SbX₅, AlOX, AlX₃, CuX, MnX₂, MgX₂, ZnX₂, HgX₂, BiX₃, NiX₂, etc.; Lewis base complex compounds of the above-mentioned halogen compounds showing Lewis acid property such as compounds of the general formulae AlX₃·(OC₂H₅)₂, BX₃·O(C₂H₅)₂, VOX₃·O(C₂H₅)₂, FeX₃·O(C₂H₅)₂, NiX₂·Py (Py represents pyridine), HgX₂·Py, etc.; organoaluminum compounds having Al-X linkage such as compounds of Al(OR)ₙX₃₋ₙ (n is a number from 1 to 2 and R is as defined above), AlRₙX₃₋ₙ (n is a number from 1 to 2 and R is as defined above), etc.; organotransition metal compounds having transition metal-X linkage such as compounds of the general formulae

OV(OR)ₙX₃₋ₙ

(n is a number from 1 to 2), Ti(OR)₄X₄₋ₙ (n is a number from 1 to 3), Zr(OR)₂X₂, Zr(OR)₃X,

(n is a number from 1 to 2), V(C₅H₅)ₙX₄₋ₙ (n is a number from 1 to 2), V(C₅H₅)₂X, OV(C₅H₅)X₂, Ti(C₅H₅)₂X, Ti(C₅H₅)X₃, Ti(C₅H₅)₂X₂, (C₅H₅)Ti(OR)X₂, (C₅H₅)₂CrX, (C₅H₅)Mo(CO)₃X, (C₅H₅)₂IrX₃, etc.;

acid halide, compounds having the general formula of

halogenated alkane compounds such as tert-butyl halide, sec-butyl halide, carbon tetrahalide, etc. and a mixture thereof.

The components of the catalyst system are normally employed in catalytic quantities. In the preferred embodiment the molar ratio of the organoaluminum compound which forms the first component of the catalyst system of the present invention to the organotitanium compound which forms the second component of the catalyst system should be in the range of 200 to 1 (200>Al/Ti>1), the optimum ratios will be found between 100 and 2 (100>Al/Ti>2).

In the preferred embodiment, the atomic ratio of titanium atom in the catalyst system of the present invention to halogen atom in the catalyst system should be in the range of 0.01 to 20 (0.01<Ti/X<20), the optimum ratios will be found between 0.02 and 10

(0.02<Ti/X<10).

Halogen atom is indispensable for forming the catalyst system of alternating copolymerization of conjugated diene and ethylene.

The conjugated dienes to be used in the present invention have from 4 to 12 carbon atoms, and typical examples are butadiene, pentadiene-1,3, hexadiene-1,3, isoprene, 2-ethyl butadiene, 2-propyl butadiene, 2-isopropyl butadiene, 2,3-dimethyl butadiene, phenyl butadiene and the like. Among them, butadiene and isoprene are preferable. A mixture thereof may also be employed.

The manner for preparing the catalyst system of this invention has not been found to be critical. The organoaluminum compound which forms the first component of the catalyst system and the organotitanium compound which forms the second component of the catalyst system or the organoaluminum compound, the organotitanium compound and halogen or halogen compound which forms the third component of the catalyst system of the present invention can be mixed per se or they can be mixed in the presence of an organic solvent. If a solvent is to be employed, the aromatic solvent such as benzene, toluene, xylene, etc.; the aliphatic hydrocarbon, e.g. propane, butane, pentane, hexane, heptane, cyclohexane, etc.; the halogenated hydrocarbon solvent such as trihaloethane, methylene halide, tetrahaloethylene, etc. are usually preferred.

In general, the organoaluminum compound which forms the first component of the catalyst system and the organotitanium compound which forms the second component of the catalyst system may be mixed at a temperature within a very wide range from −100° C. to +100° C., and preferably from −78° C. to +50° C. This temperature is shown as catalyst preparation temperature in the Tables given hereinafter. The halogen or halogen compound which forms the third component of the catalyst system may be mixed with the other one or two components of the catalyst system of this invention at a temperature within a very wide range from −100° C. to +100° C., and preferably from −78° C. to +50° C.

Polymerization temperature may be from −100° C. to +100° C., preferably from −78° C. to +50° C.

Any pressure can be used provided that said pressure can keep the reaction system in liquid phase.

The practice of this copolymerization is usually carried out in the presence of an organic solvent or diluent. However, this does not mean that this invention cannot be practiced in the form of bulk polymerization, i.e. without the use of solvent. If it is desired to use a solvent, the aromatic solvent such as benzene, toluene, xylene, etc.; the aliphatic hydrocarbon, e.g. propane, butane, pentane, hexane, heptane, cyclohexane, etc.; halogenated hydrocarbon solvent such as trihaloethane, methylene halide, tetrahaloethylene and the like may also be employed.

At the completion of the copolymerization, the products may be precipitated and deashed by using a methanol-hydrochloric acid mixture. The precipitated product may further be washed with methanol for several times and dried under vacuum. As occasion demands, ethylene rich random copolymer of conjugated diene and ethylene is removed from the precipitated product by usual solvent extraction method. The alternating copolymer of conjugated diene and ethylene of the present invention is soluble in chloroform, n-heptane, toluene, diethyl ether, etc., on the other hand ethylene rich random copolymer of conjugated diene and ethylene is insoluble in the above solvents.

BRIEF DESCRIPTION OF THE DRAWINGS

Referring to FIG. 1, it is found that microstructure of butadiene unit of the copolymer is composed of trans-1,4, cis-1,4 and 1,2 configurations and moreover it is rich in trans-1,4. Referring to FIG. 2, the ratio of 1,4-structure to 1,2 structure was calculated to be 87/13. Referring again to FIG. 1, from the strength and shape of 722 cm.$^{-1}$ band, it is possible to confirm the existence of cis-1,4 configuration, but it is impossible to measure it. Referring to FIG. 3, it is found that microstructure of isoprene unit of the copolymer is substantially composed of 1,4-structure and 3,4-structure. There can be seen no peak near 909 cm.$^{-1}$ which corresponds to the band assigned to 1,2-structure of isoprene unit. The 890 cm.$^{-1}$ band and broad 840 cm.$^{-1}$ band are assigned to 3,4- and 1,4-structures of isoprene unit of the copolymer, respectively. Referring to FIG. 4, by measuring the ratio of peak area of the triplet at 4.9τ to half of that of the peak at 5.32τ, the ratio of 1,4-structure to 3,4-structure is found to be 53/47. The 8.32τ peak may be ascribed to methyl group of cis-1,4-structure of isoprene unit and 8.42τ peak may be ascribed to the total of methyl groups of trans-1,4- and 3,4-structures of isoprene unit of the copolymer. Therefore, it is found that the ratio of cis-1,4-structure to trans-1,4-structure (cis-1,4/trans-1,4) in the alternating copolymer employed in FIG. 3 is 44/9.

Figure 1:
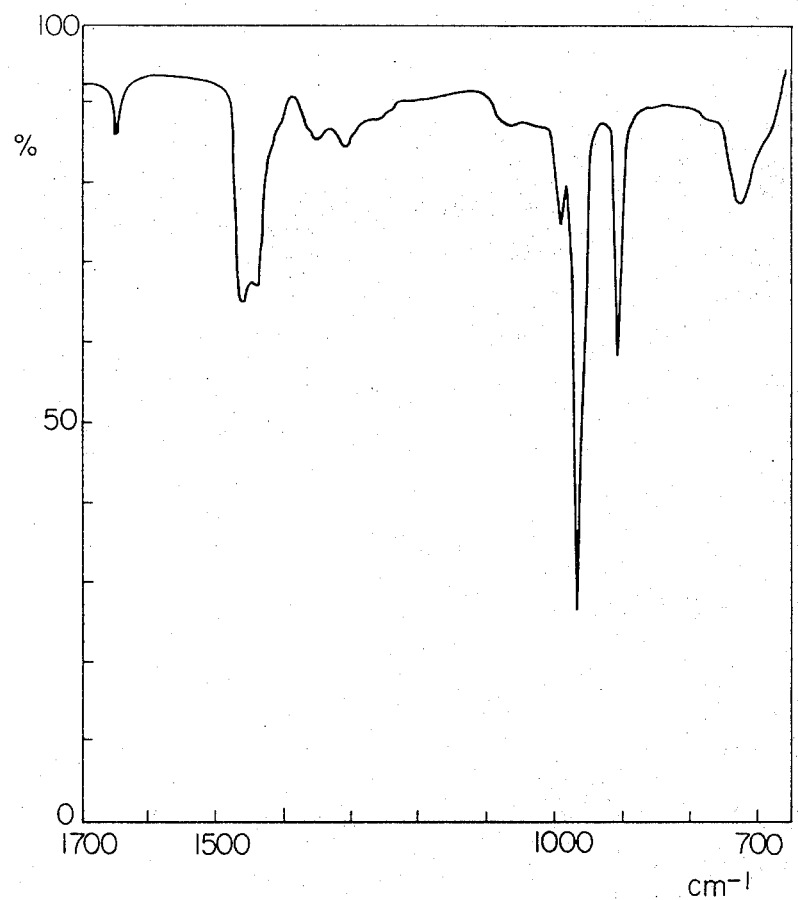
FIG. 1 shows a typical example of the infra-red spectrum of a solid film of an alternating copolymer of butadiene and ethylene of the present invention on rock salt.
Figure 2:
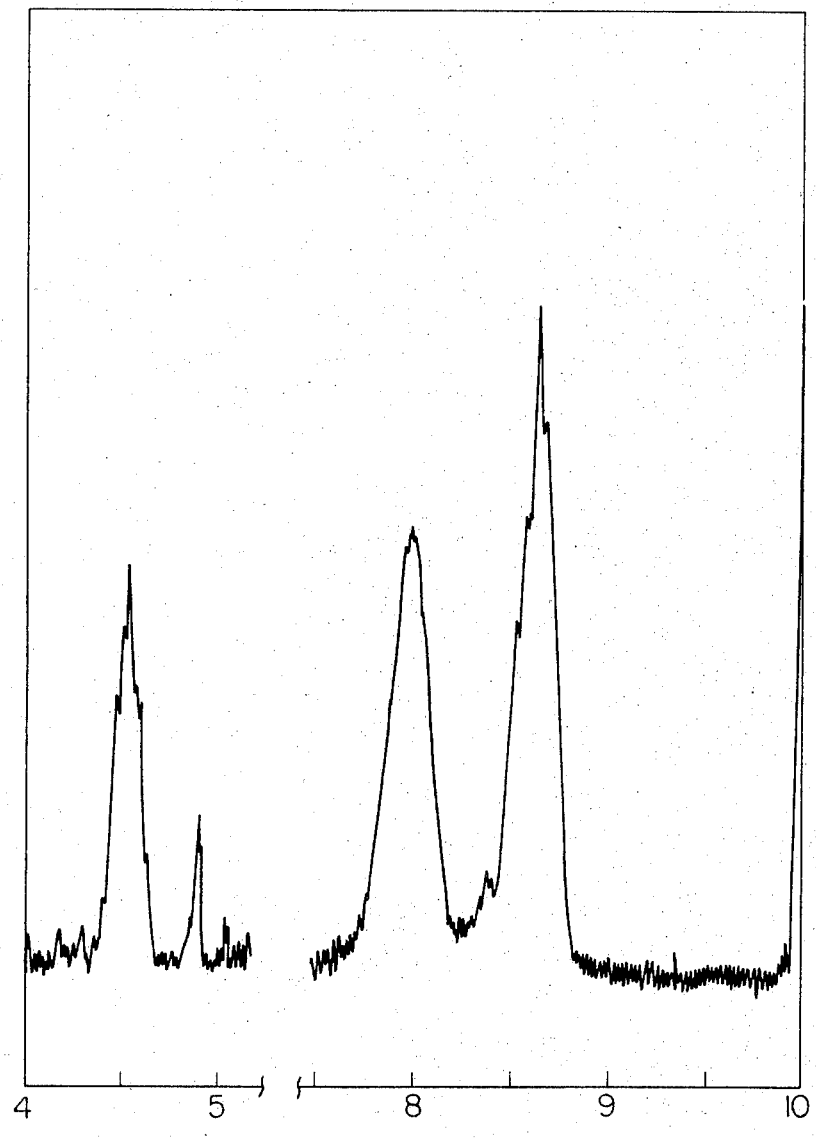
FIG. 2 shows the 60 mHz. nuclear magnetic resonance spectrum of the copolymer employed in FIG. 1.
Figure 3:
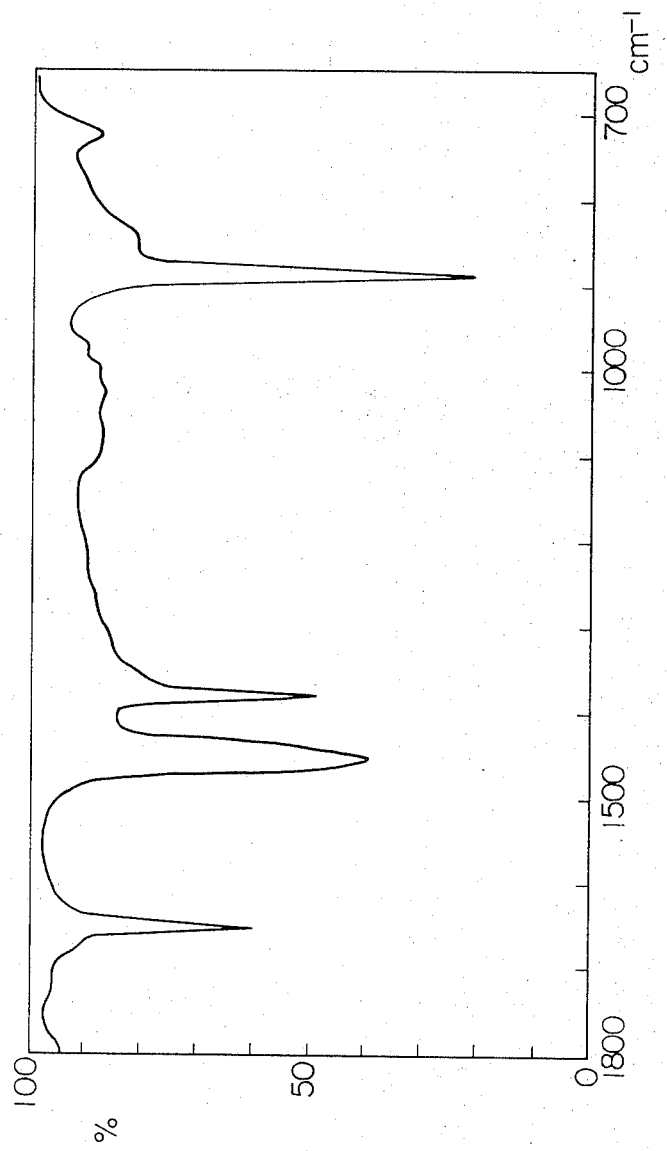
FIG. 3 shows a typical example of the infra-red spectrum of a solid film of an alternating copolymer of isoprene and ethylene of the present invention on rock salt.
Figure 4:
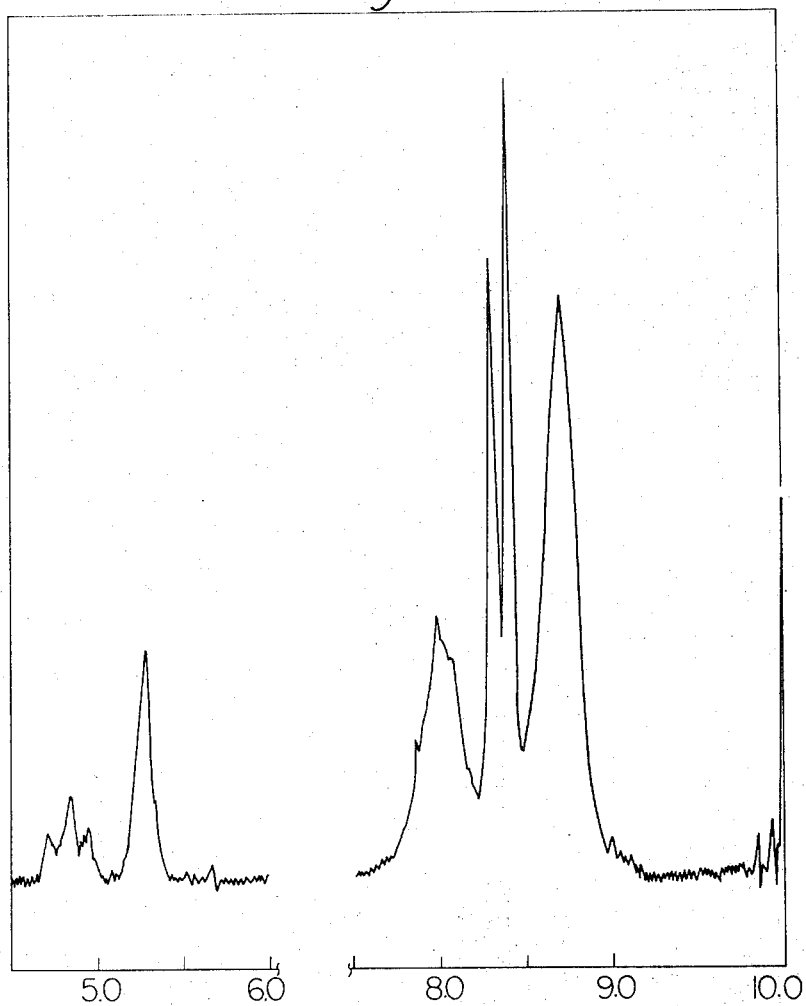
FIG. 4 shows the 60 mHz. nuclear magnetic resonance spectrum of the copolymer employed in FIG. 3.

The invention will be illustrated with reference to the following Examples.

Example 1

The usual, dry, air-free technique was employed and 50.4 liters toluene and 0.498 mole

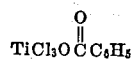

were put into 100 liters stainless steel reaction vessel at 25° C. Then, 1.241 mole triisobutylaluminum, 13.00 kg. butadiene and 1.38 kg. ethylene were put successively into the vessel also employing the usual, dry, air-free technique at −30° C. Thereafter, the vessel was sealed and allowed to copolymerize at −30° C. for 5 hours under agitation.

Methyl ethyl ketone insoluble and toluene soluble fraction was collected from the reaction product as an alternating copolymer of butadiene and ethylene. The yield of the fraction was 3.52 kg. and its intrinsic viscosity was 2.1 (dl./g.) in toluene at 30° C. Toluene insoluble fraction was ethylene rich random copolymer of butadiene and ethylene. The yield of the fraction was 0.88 kg. and the molar ratio of ethylene unit to butadiene unit of the fraction was 92/8.

The vulcanization of the alternating copolymer of butadiene and ethylene was carried out in the following way (part means weight part):

100 parts of copolymer,
50 parts of oil furnace black (HAF),
5 parts of zinc oxide, Methyl isobutyl ketone insoluble and pentane soluble fraction was collected as an alternating copolymer of butadiene and ethylene. It showed rubber-like elasticity. Pentane insoluble fraction was ethylene rich random copolymer of butadiene and ethylene. It was resinous Methyl isobutyl ketone soluble fraction was low molecular weight random copolymer of butadiene and ethylene.

TABLE 1

| Example number | Catalyst [1] Organo-titanium compound | Mmol | Organotitanium compound | Mmol | Polymerization conditions Temp. (°C.) | Time (hr.) | Copolymer [2] MIBK soluble fraction, yield (g.) | MIBK insoluble, pentane soluble fraction, yield (g.) | Pentane insoluble fraction Yield (g.) | Molar ratio of ethylene to butadiene (ethylene/butadiene) |
|---|---|---|---|---|---|---|---|---|---|---|
| 1 | AliBu$_3$ | 0.5 | TiCl$_3$(OCCH$_3$) | 0.1 | 0 | 15 | 1.19 | 0.49 | 8.90 | 41/1 |
| 2 | AliBu$_3$ | 0.5 | TiCl$_2$(OCC$_2$H$_5$)$_2$ | 0.1 | 0 | 15 | 0.09 | 0.47 | 2.38 | |
| 3 | AliBu$_3$ | 1.0 | TiCl$_2$(OCC$_2$H$_5$)$_2$ | 0.1 | −30 | 16 | 0.26 | 0.22 | 1.46 | |
| 4 | AlEt$_3$ | 1.0 | TiCl$_2$(OCC$_2$H$_5$)$_2$ | 0.1 | −30 | 16 | 0.11 | 0.06 | 0.86 | |
| 5 | AliBu$_3$ | 1.0 | TiCl$_3$(OCCH$_3$) | 0.02 | −30 | 16 | 0.36 | 0.09 | 0.93 | |
| 6 | AliBu$_3$ | 1.0 | O[TiCl(OCC$_2$H$_5$)$_2$]$_2$ | 0.1 | −30 | 16 | 0.03 | 0.15 | 0.77 | |
| 7 | Al(hexyl)$_3$ | 1.0 | TiCl$_2$(OCC$_2$H$_5$)$_2$ | 0.2 | −30 | 16 | 0.22 | 0.18 | 1.35 | |

[1] AliBu$_3$: triisobutylaluminum, AlEt$_3$: triethylaluminum, Al(hexyl)$_3$: trihexylaluminum.
[2] MIBK: methyl isobutyl ketone.

1.5 parts of sulphur
1 part of stearic acid,
1 part of phenyl-β-naphthyl amine, and
1 part of benzothiazyl disulfide were mixed on a roller and vulcanized at 150° C. for 13 minutes.

The results obtained by the vulcanization had the following values:

elongation at break at 25° C.: 460%
tensile strength at 25° C.: 174 kg./cm.$^2$
modulus 300% at 25° C.: 93 kg./cm.$^2$ Example 2

The usual, dry, air-free technique was employed and 5.0 milliliters toluene and varying amounts of organotitanium compound were put into 30 milliliters stainless steel reaction vessels at 25° C. Then, the vessels were held in a low temperature bath at −78° C. Thereafter, varying amounts of organoaluminum solution in toluene (1 molar solution), 10.0 milliliters liquid butadiene and 7.0 g. ethylene were put successively into the vessels also employing the usual, dry, air-free technique. Thereafter, the vessels were sealed and allowed to copolymerize at predetermined temperature and for predetermined time. The results were summarized in Table 1.

Example 3

The usual, dry, air-free technique was employed and 10.0 milliliters toluene and varying amounts of organotitanium compound were put into 30 milliliters stainless steel reaction vessels at 25° C. Then, the vessels were held in a constant temperature bath showing predetermined temperature (it corresponds to catalyst preparation temperature given in Table 2). Then, 1.0 milliliter triisobutylaluminum solution in toluene (1 molar solution), varying amounts of liquid isoprene and varying amounts of ethylene were put successively into the vessels also employing the usual, dry, air-free technique. Thereafter, the vessels were sealed and allowed to copolymerize at predetermined temperature and for predetermined time. The results were summarized in Table 2.

Methyl ethyl ketone insoluble and chloroform soluble fraction was collected as an alternating copolymer of isoprene and ethylene. It showed rubber-like elasticity. Chloroform insoluble fraction was ethylene rich random copolymer of isoprene and ethylene. It was resinous. Methyl ethyl ketone soluble fraction was low molecular weight random copolymer of isoprene and ethylene.

TABLE 2

| Example number | Catalyst [1] | | Monomers | | Catalyst preparation temperature (°C.) | Polymerization conditions | | Copolymer yield [2] | | |
|---|---|---|---|---|---|---|---|---|---|---|
| | AliBu₃ (mmol) | Organotitanium compound | Mmol | Liquid isoprene (ml.) | Ethylene (g.) | | Temp. (°C.) | Time (hours.) | MEK soluble fraction (g.) | MEK insoluble chloroform soluble fraction (g.) | Chloroform insoluble fraction (g.) |
| 1 | 1.0 | $TiCl_3(O\overset{O}{\overset{\|}{C}}CH_3)$ | 0.1 | 5.0 | 7.0 | −78 | 0 | 16 | 0.33 | 1.16 | 7.56 |
| 2 | 1.0 | $TiCl_2(O\overset{O}{\overset{\|}{C}}C_2H_5)_2$ | 0.1 | 5.0 | 7.0 | −78 | 0 | 16 | 0.50 | 1.22 | 7.04 |
| 3 | 1.0 | $TiCl_3(O\overset{O}{\overset{\|}{C}}C_2H_5)$ | 0.2 | 10.0 | 4.0 | 20 | −40 | 25 | 0.45 | 1.00 | 5.47 |

[1] AliBu₃: triisobutylaluminum.
[2] MEK: methyl ethyl ketone.

Example 4

The usual, dry, air-free technique was employed and 10.0 milliliters toluene and 0.2 millimole organotitanium compound were put into 30 milliliters stainless steel reaction vessels at 25° C. Then, the vessels were held in a low temperature bath at −78° C. Thereafter, 1.0 milliliter triisobutylaluminum solution in toluene (1 molar solution), 10.0 milliliters liquid isoprene and 4.0 g. ethylene were put successively into the vessels also employing the usual, dry-air-free technique. Then, the vessels were sealed and allowed to copolymerize at predetermined temperature and for 17 hours. The results were summarized in Table 3. The alternating copolymer also showed rubber-like elasticity.

Example 5

The usual, dry, air-free technique was employed and 5.0 milliliters toluene, 0.1 millimole organotitanium compound and varying amounts of halogen compound were put successively into 30 milliliters stainless steel reaction vessels at 25° C. Then, the vessels were left alone at 25° C. for 10 minutes. Thereafter, the vessels were held in a low temperature bath at −78° C. Then, 1.0 milliliter triisobutylaluminum solution in toluene (1 molar solution), 10.0 milliliters liquid butadiene and 7.0 g. ethylene were put successively into the vessels also employing the usual, dry, air-free technique. Then, the vessels were sealed and allowed to copolymerize at −30° C. for 16 hours. The results were summarized in Table 4.

TABLE 3

| Example number | Catalyst [1] | | | Polymerization conditions | | MEK soluble fraction, yield (g.) | Copolymer [2] | | | | | | |
|---|---|---|---|---|---|---|---|---|---|---|---|---|---|
| | | | | | | | MEK insoluble, chloroform soluble fraction | | | | | Chloroform insoluble fraction | |
| | AliBu₃ (mmol) | Organotitanium compound | Mmol | Temp. (°C.) | Time (hours) | | Yield (g.) | Isoprene microstructure, percent | | | [η] (dl./g.) | Yield (g.) | Molar ratio of ethylene to isoprene (ethylene/isoprene) |
| | | | | | | | | 3,4 | Trans-1,4 | Cis-1,4 | | | |
| 1 | 1.0 | $TiCl(O\overset{O}{\overset{\|}{C}}C_2H_5)_3$ | 0.2 | 0 | 17 | 0.02 | 0.11 | 31 | 20 | 49 | | 1.81 | |
| 2 | 1.0 | $TiCl_2(O\overset{O}{\overset{\|}{C}}C_2H_5)_2$ | 0.2 | 0 | 17 | 0.39 | 2.05 | 43 | 8 | 49 | 2.0 | 2.65 | 98/2 |
| 3 | 1.0 | $TiCl_3(O\overset{O}{\overset{\|}{C}}C_2H_5)$ | 0.2 | 0 | 17 | 0.34 | 3.28 | 44 | 8 | 48 | 0.7 | 3.53 | 98/2 |
| 4 | 1.0 | $TiCl_3(O\overset{O}{\overset{\|}{C}}C_2H_5)$ | 0.2 | −45 | 17 | 0.14 | 1.68 | 44 | 8 | 48 | 0.5 | 3.77 | |
| 5 | 1.0 | $TiCl_3(O\overset{O}{\overset{\|}{C}}C_2H_5)$ | 0.2 | −30 | 17 | 0.36 | 3.10 | 41 | 11 | 48 | 0.4 | 5.21 | |
| 6 | 1.0 | $TiCl_3(O\overset{O}{\overset{\|}{C}}C_2H_5)$ | 0.2 | 20 | 17 | 0.69 | 2.78 | 41 | 11 | 48 | 0.4 | 4.03 | |

[1] AliBu₃: triisobutylaluminum.
[2] MEK: methyl ethyl ketone.

NOTE.—[η]: intrinsic viscosity measured in toluene at 30° C.

TABLE 4

| Example number | Catalysts [1] | | | | | Copolymer [2] | | | | |
| | AliBu₃ (mmol) | Organotitanium compound | Mmol | Halogen compound | Mmol | MIBK soluble fraction, yield (g.) | MIBK insoluble, pentane soluble fraction | | Pentane insoluble fraction | |
| | | | | | | | Yield (g.) | [η] (dl./g.) | Yield (g.) | Molar ratio of ethylene to butadiene (ethylene/butadiene) |
|---|---|---|---|---|---|---|---|---|---|---|
| 1 | 1.0 | Ti(OCHCH₃)₂(OCCH₃)₂ with CH₃ and O | 0.1 | AlCl₃·O(C₂H₅)₂ | 0.2 | 0.12 | 0.03 | | 0.62 | |
| 2 | 1.0 | O[Ti(OCCH₃)₃]₂ | 0.1 | SnCl₄ | 0.2 | 0.01 | 0.30 | | 0.02 | |
| 3 | 1.0 | O[Ti(OCCH₃)₃]₂ | 0.1 | CrO₂Cl₂ | 0.1 | 0.56 | 0.44 | | 0.73 | |
| 4 | 1.0 | TiCl₂(OCC₂H₅)₂ | 0.1 | C₆H₅COCl | 0.1 | 0.15 | 2.11 | 0.7 | 6.28 | 6/1 |
| 5 | 1.0 | TiCl₂(OCC₂H₅)₂ | 0.1 | SnCl₄ | 0.1 | 0.32 | 1.82 | | 8.11 | |
| 6 | 1.0 | TiCl₂(OCC₂H₅)₂ | 0.1 | AlCl₃·O(C₂H₅)₂ | 0.1 | 0.30 | 0.82 | | 4.43 | |
| 7 | 1.0 | TiCl₂(OCC₂H₅)₂ | 0.1 | CrO₂Cl₂ | 0.1 | 0.59 | 1.22 | | 7.93 | |
| 8 | 1.0 | TiCl₂(OCC₂H₅)₂ | 0.1 | tert-BuCl | 0.1 | 0.33 | 0.63 | | 5.44 | |
| 9 | 1.0 | TiCl₂(OCC₂H₅)₂ | 0.1 | AlBr₃ | 0.1 | 0.40 | 0.39 | | 2.88 | |
| 10 | 1.0 | TiCl₂(OCC₂H₅)₂ | 0.1 | I₂ | 0.1 | 0.35 | 0.43 | | 3.02 | |
| Ref | 1.0 | Ti(OCHCH₃)₂(OCCH₃)₂ with CH₃ and O | 0.1 | | | | 0 | | | |

[1] AliBu₃: triisobutylaluminum, tert-BuCl: tert-butyl chloride.
[2] MIBK: methyl isobutyl ketone.

NOTE.—[η]: intrinsic viscosity measured in toluene at 30° C.

Methyl isobutyl ketone insoluble and pentane soluble fraction was collected as an alternating copolymer of butadiene and ethylene. It showed rubber-like elasticity. Pentane insoluble fraction was ethylene rich random copolymer of butadiene and ethylene. It was resinous. Methyl isobutyl ketone soluble fraction was low molecular weight random copolymer of butadiene and ethylene. As can be seen in Ref. Example in Table 4, the catalyst having no halogen atom gives no alternating copolymer.

Example 6

The usual, dry, air-free technique was employed and 10.0 milliliters toluene, 0.1 millimole organotitanium compound and 0.1 millimole halogen compound were put successively into 30 milliliters stainless steel reaction vessels at 25° C. Then, the vessels were left alone at 25° C. for 10 minutes. Thereafter, the vessels were held in a low temperature bath at −78° C. Then, 1.0 milliliter triisobutylaluminum solution in toluene (1 molar solution), 5.0 milliliters liquid isoprene and 7.0 g. ethylene were put successively into the vessels also employing the usual, dry, air-free technique. Then the vessels were sealed and allowed to copolymerize at 0° C. for 16 hours. The results were summarized in Table 5.

Methyl ethyl ketone insoluble and chloroform soluble fraction was collected as an alternating copolymer of isoprene and ethylene. It showed rubber-like elasticity. Chloroform insoluble fraction was ethylene rich random copolymer of isoprene and ethylene. It was resinous. Methyl ethyl ketone soluble fraction was low molecular weight random copolymer of isoprene and ethylene. As can be seen in Reference Example in Table 5, the catalyst having no halogen atom gives no alternating copolymer.

TABLE 5

| | Catalysts[1] | | | | | Copolymer | | | | |
|---|---|---|---|---|---|---|---|---|---|---|
| | | | | | | | MEK insoluble, chloroform soluble fraction | | | |
| | | | | | | | | Isoprene microstructure, percent | | |
| Example Number | AliBu₃ (mmol) | Organotitanium compound | Mmol | Halogen compound | Mmol | MEK soluble fraction, yield (g.) | Yield (g.) | 1,4 | 3,4 | Glass transition temp. (° C.) | Chloroform insoluble yield (g.) |
| 1 | 1.0 | TiCl₂(OCC₂H₅)₂ with O=C | 0.4 | SnCl₄ | 0.1 | 0.89 | 1.54 | | | | 9.10 |
| 2 | 1.0 | TiCl₂(OCC₂H₅)₂ | 0.1 | C₆H₅COCl | 0.1 | 0.15 | 2.03 | | | −55 | 7.10 |
| 3 | 1.0 | Ti(OCHCH₃)₂(OCCH₃)₂ | 0.1 | C₆H₅COCl | 0.1 | 0.01 | 0.02 | | | | 0.24 |
| 4 | 1.0 | O[Ti(OCCH₃)₃]₂ | 0.1 | BF₃·O(C₂H₅)₂ | 0.1 | 0.02 | 0.02 | | | | 0.77 |
| 5 | 1.0 | O[Ti(OCCH₃)₃]₂ | 0.1 | AlCl₃·O(C₂H₅)₂ | 0.1 | 0.11 | 0.57 | 55 | 45 | −53 | 8.78 |
| 6 | 1.0 | O[Ti(OCCH₃)₃]₂ | 0.1 | SnCl₄ | 0.1 | 0.04 | 0.07 | | | | 0.48 |
| 7 | 1.0 | O[Ti(OCCH₃)₃]₂ | 0.1 | I₂ | 0.1 | 0.05 | 0.03 | | | | 0.88 |
| Ref | 1.0 | O[Ti(OCCH₃)₃]₂ | 0.1 | | | 0 | | | | | |

[1] AliBu₃: triisobutylaluminum.

What we claim is:

1. A process for preparing a polymerization product selected from the group consisting of 1:1 alternating copolymer of a conjugated diene and ethylene the microstructure of the conjugated diene of which copolymer is lacking in stereospecificity, an ethylene rich random copolymer of ethylene and a conjugated diene and a mixture thereof comprising contacting said conjugated diene and ethylene in liquid phase with a catalyst comprising (A) an organoaluminum compound having the formula $AlR_3$ wherein R represents a hydrocarbon radical selected from the group consisting of a $C_1$–$C_{12}$ alkyl, aryl, cycloalkyl and aralkyl radical and (B) an organotitanium compound having

structure (R is the same as defined above and X is halogen) in the molecule.

2. A process of Claim 1 wherein a component selected from the group consisting of a halogen, a halogen-containing compound having Lewis acid property, an organoaluminum compound having Al-X linkage, an organotransition metal compound having transition metal-X linkage, an acid halide, a compound having the general formula of

tert-butyl halide, sec-butyl halide, carbon tetrahalide and a mixture thereof is further added to the catalyst, wherein X represents halogen.

3. A process of Claim 1 wherein the atomic ratio of aluminum atom contained in the organoaluminum compound to titanium atom contained in the organotitanium compound is within a range from 1 to 200.

4. A process of Claim 2 wherein the atomic ratio of titanium atom contained in the organotitanium compound to the halogen or halogen atom contained in the halogen compound is within a range from 0.01 to 20.

5. A process of Claim 1 wherein the catalyst preparation temperature is within a range from −100° C. to +100° C.

6. A process of Claim 1 wherein polymerization is carried out at a temperature within a range from −100° C. to +100° C.

7. A process of Claim 1 wherein said conjugated diene has from 4 to 12 carbon atoms in the molecule.

8. A process of Claim 1 wherein said conjugated diene has from 4 to 5 carbon atoms in the molecule.

9. A process of Claim 1 wherein polymerization is carried out in the presence of an organic solvent.

10. A process of Claim 1 wherein the catalyst components are commingled in the presence of an organic solvent.

11. A process of Claim 1 wherein the atomic ratio of aluminum atom contained in the organoaluminum compound to titanium atom contained in the organotitanium compound is within a range from 1 to 200, the catalyst preparation temperature and polymerization temperature are within a range from −100° C. to +100° C., catalyst preparation and polymerization are carried out in the presence of an organic solvent and the conjugated diene has from 4 to 12 carbon atoms in the molecule.

12. A process of Claim 1 wherein the atomic ratio of aluminum atom contained in the organoaluminum compound to titanium atom contained in the organotitanium compound is within a range from 2 to 100, the catalyst preparation temperature and polymerization temperature are within a range from −78° C. to +50° C., catalyst preparation and polymerization are carried out in the presence of an organic solvent selected from the group consisting of aliphatic hydrocarbons, aromatic hydrocarbons, halogenated hydrocarbons and mixtures thereof and the conjugated diene is selected from the group consisting of butadiene and isoprene.

13. A process of Claim 2 wherein the atomic ratio of aluminum atom contained in the organoaluminum compound to titanium atom contained in the organotitanium compound is within a range from 1 to 200, the atomic ratio of titanium atom contained in the organotitanium compound to the halogen or halogen atom contained in the halogen compound is within a range from 0.01 to 20

(0.01 <Ti/X <20), the catalyst preparation temperature and polymerization temperature are within a range from —100° C. to +100° C., catalyst preparation and polymerization are carried out in the presence of an organic solvent and the conjugated diene has from 4 to 12 carbon atoms in the molecule.

14. A process of Claim 2 wherein the atomic ratio of aluminum atom contained in the organoaluminum compound to titanium atom contained in the organotitanium compound is within a range of from 2 to 100, the atomic ratio of titanium atom contained in the organotitanium compound to the halogen or halogen atom contained in the halogen-containing compound is within a range of from 0.02 to 10, the catalyst preparation and polymerization are carried out at a temperature within a range from —78° C. to +50° C. in the presence of an organic solvent selected from the group consisting of aliphatic hydrocarbons, aromatic hydrocarbons, trihaloethane, methylene halide, tetrahaloethylene and mixtures thereof and the conjugated diene is selected from the group consisting of butadiene and isoprene.

References Cited
UNITED STATES PATENTS

| | | | |
|---|---|---|---|
| 3,737,416 | 6/1973 | Hayashi et al. | 260—85.3 R |
| 3,737,417 | 6/1973 | Hayashi et al. | 260—85.3 R |
| 2,943,063 | 6/1960 | Eby et al. | 252—429 |
| 3,317,496 | 5/1967 | Natta et al. | 260—88.2 R |
| 3,541,074 | 11/1970 | Anderson et al. | 260—94.9 |

JOSEPH L. SCHOFER, Primary Examiner

A. HOLLER, Assistant Examiner

U.S. Cl. X.R.

260—88.2 R

UNITED STATES PATENT OFFICE
CERTIFICATE OF CORRECTION

Patent No. 3,824,223            Dated July 16, 1974

Inventor(s) KIYOSHIGE HAYASHI et al

It is certified that error appears in the above-identified patent and that said Letters Patent are hereby corrected as shown below:

Column 4, line 74: replace "sepaarated" with ---separated--- .

Column 5, line 33: after "triphenylaluminum, insert a comma.

Column 10, line 5: after "resinous", insert a period.

Columns 13-14: in Table 4, beside Ex. #4, replace "0.15"

with ---0.16--- .

Columns 15-16: in Table 5, beside Ex. #1, replace "0.4"

with ---0.1--- .

Signed and sealed this 11th day of February 1975.

(SEAL)
Attest:

RUTH C. MASON
Attesting Officer

C. MARSHALL DANN
Commissioner of Patents
and Trademarks